United States Patent
Sato

(10) Patent No.: US 7,459,873 B2
(45) Date of Patent: Dec. 2, 2008

(54) METHOD FOR EXTRACTING MAXIMUM GAIN OF SERVO CONTROLLER

(75) Inventor: Kazuo Sato, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 408 days.

(21) Appl. No.: 10/567,085

(22) PCT Filed: Jun. 28, 2004

(86) PCT No.: PCT/JP2004/009102

§ 371 (c)(1),
(2), (4) Date: Feb. 3, 2006

(87) PCT Pub. No.: WO2005/013018

PCT Pub. Date: Feb. 10, 2005

(65) Prior Publication Data

US 2008/0143287 A1 Jun. 19, 2008

(30) Foreign Application Priority Data

Aug. 5, 2003 (JP) .............................. 2003-286708

(51) Int. Cl.
*G05B 11/38* (2006.01)
(52) U.S. Cl. .................. 318/619; 318/623; 318/632
(58) Field of Classification Search ............... 318/560, 318/561, 568.22, 611, 619, 621, 623, 632, 318/558

See application file for complete search history.

(56) References Cited

U.S. PATENT DOCUMENTS

| 4,087,793 | A | * | 5/1978 | Lucas | 377/39 |
| 4,891,837 | A | * | 1/1990 | Walker et al. | 379/390.01 |
| 5,610,709 | A | * | 3/1997 | Arrington et al. | 356/218 |
| 6,157,156 | A | * | 12/2000 | Tsuruta | 318/609 |
| 6,832,127 | B1 | * | 12/2004 | Hao et al. | 700/170 |
| 7,292,001 | B2 | * | 11/2007 | Sato et al. | 318/623 |

FOREIGN PATENT DOCUMENTS

| JP | 62-187903 A | 8/1987 |
| JP | 2-261083 A | 10/1990 |

* cited by examiner

*Primary Examiner*—Bentsu Ro
(74) *Attorney, Agent, or Firm*—Sughrue Mion, PLLC

(57) ABSTRACT

It is an object of the present invention to provide a method for extracting a maximum gain of a servo controller in which while a machine is vibrated by raising a control gain, the vibration is rapidly detected so that the machine does not greatly vibrate or noise is not generated.

In a method for extracting a maximum gain of a servo controller for driving a servo motor, a simulated disturbance torque is applied to a torque command by a vibrating unit while a control gain is raised and the vibration of a control system is detected by a vibration detecting unit (1). A process for applying the simulated disturbance torque is repeated while the control gain is raised until the vibration of a prescribed level is detected. The control gain when the vibration detecting unit (1) detects the vibration exceeding the prescribed level is set as a maximum gain.

1 Claim, 5 Drawing Sheets

METHOD FOR EXTRACTING MAXIMUM GAIN OF SERVO CONTROLLER

TECHNICAL FIELD

The present invention relates to a method for automatically setting a servo control gain in a servo controller for driving a servo motor, and more particularly to a method for vibrating a machine or the like by a vibrating unit and detecting the vibration to set the maximum value of the servo control gain.

RELATED ART

Usually, as disclosed in Patent Document 1, an adjustment is carried out that a gain is firstly increased to oscillate a machine, and then, the maximum value of a servo control gain is obtained by considering the characteristics of the machine. In the usual technique, after the control gain is raised, an oscillation is caught after the machine oscillates. Accordingly, there is a problem that it takes time until the oscillation is detected. That is, during stopping of the machine, even when the control gain is raised, the machine does not immediately oscillate. Further, even during the operation of the machine, the machine begins to vibrate at a specific position such as at the time of completion of acceleration or deceleration as shown in FIG. 6($a$). This phenomenon arises because a friction or a load existing in the machine serves to suppress the oscillation. When there is no great opportunity, the machine does not actually oscillate. Thus, as shown in FIG. 6($b$), to readily oscillate the machine, commands of high speed and long feed time need to be repeated and the control gain needs to be gradually raised in accordance with the repetition of the commands by anticipating a delay of time until the oscillation is started. Therefore, it has required long time until the maximum gain is detected.

Patent Document 1: JP-A-2-261083

DISCLOSURE OF THE INVENTION

Problems to be Solved by the Invention

When the control gains is quickly raised as shown in FIG. 7 to shorten time until the maximum gain is detected, the control gain is excessively raised at the time of detecting the oscillation. After that, when the control gain is lowered, the oscillation does not readily stop and the machine undesirably greatly vibrates or noise is generated. Further, even if a speed gain can be identified, the speed gain is large, so that when a position loop is arranged outside a speed loop in a next process, a control system undesirably vibrates.

Means for Solving the Problems

Thus, it is an object of the present invention to provide a method for extracting a maximum gain of a servo controller in which while a control gain is raised to vibrate a machine, a vibration is rapidly detected so that the machine does not greatly vibrate or noise is not generated.

To solve the above-described problems, a method for extracting a maximum gain is characterized in that a simulated disturbance torque is applied to a torque command by a vibrating unit while a control gain is raised and the vibration of a control system is detected by a vibration detecting unit, a process for applying the simulated disturbance torque is repeated while the control gain is raised until the vibration of a prescribed level is detected and the control gain when the vibration detecting unit detects the vibration exceeding the prescribed level is set as a maximum gain.

ADVANTAGE OF THE INVENTION

According to the present invention, a machine can be assuredly vibrated by a simulated disturbance torque meeting the machine to obtain a maximum gain. Further, since the gain can be immediately lowered after the vibration to suppress the vibration, the gain may not be raised to a required level or higher and a risk due to the vibration can be prevented.

BRIEF DESCRIPTION OF THE DRAWINGS

FIG. 6($b$) is a timing chart when the gain is raised under an ordinary operation.

DESCRIPTION OF REFERENCE NUMERALS AND SIGNS

Figure 1:
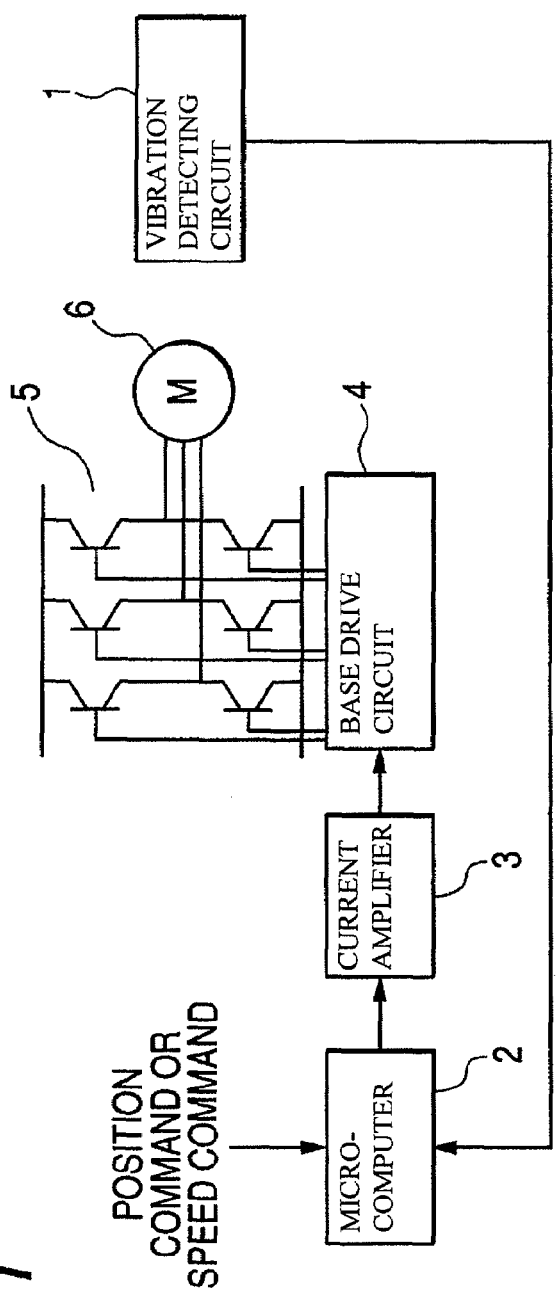
FIG. 1 is a block diagram of a specific embodiment of the present invention and a usual example.

1: vibration detecting circuit
2: microcomputer
3: current amplifier
4: base drive circuit
5: power transistor module
6: motor
7: position loop gain
8: speed control
9: motor
10: integration
11: microcomputer
12: current amplifier
13: base drive circuit
14: power transistor module
15: motor

BEST MODE FOR CARRYING OUT THE INVENTION

Now, a specific embodiment of the present invention will be described below by referring to the drawings.

First Embodiment

FIG. 1 is a block diagram of a specific embodiment of the present invention. In FIG. 1, reference numeral 1 designates a vibration detecting circuit, 2 designates a microcomputer, 3 designates a current amplifier, 4 designates a base drive circuit, 5 designates a power transistor module and 6 designates a motor.

Figure 2:
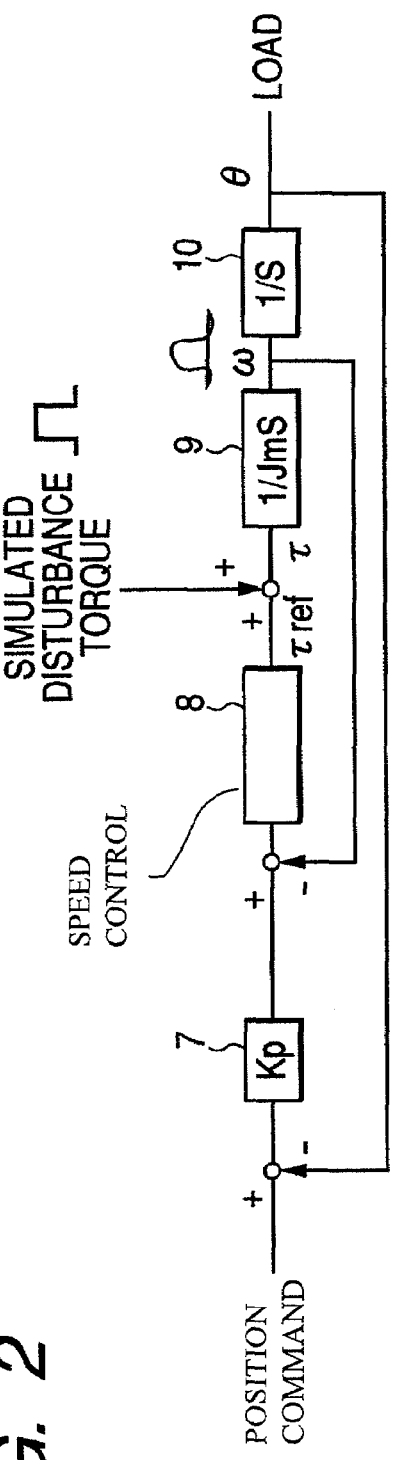
FIG. 2 is a control block diagram of the specific embodiment of the present invention.
Figure 3:
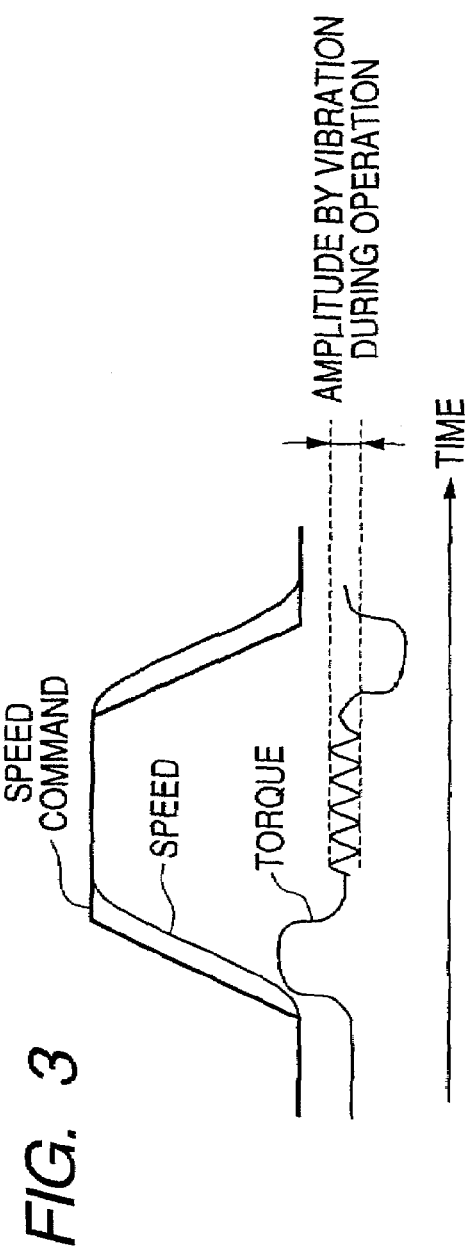
FIG. 3 is a measuring timing chart of a speed command, speed, a wave-form of a torque and a vibration level during an ordinary operation.
Figure 4:
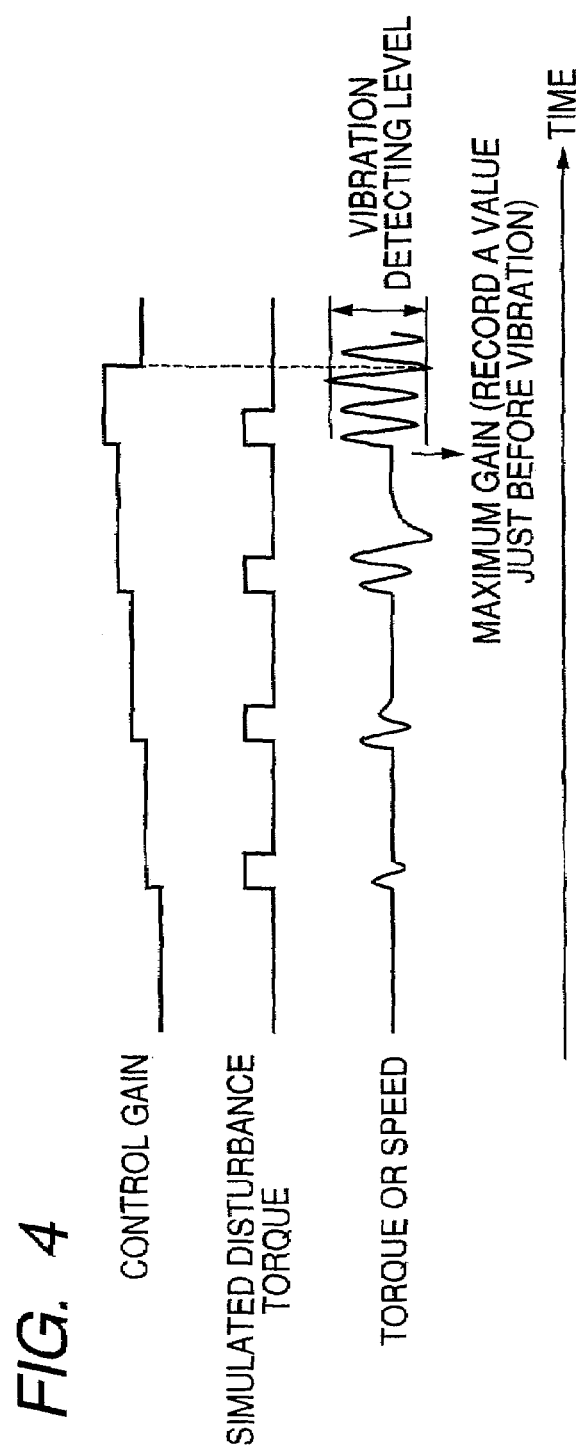
FIG. 4 is a timing chart for generating a vibration by raising a gain and a timing chart for lowering a gain and extracting a maximum gain when the vibration is generated.

In a circuit constructed as described above, an operation thereof is described by using a control block diagram of FIG. 2 and a timing chart of FIG. 4. Firstly, a microcomputer 2 receives a command of a position or speed from an external controller. Then, in the case of the speed command, the microcomputer controls the speed to output a current command or a current control and drives a power transistor 5 through a base drive circuit 4 to control a motor 6. Here, a vibration detecting circuit 1 decides a vibration when a vibration component included in a torque command or a speed signal of the motor exceeds a predetermined level (a detecting level). The detecting level is determined from an amplitude by vibration during an ordinary operation under a stable state of a control system, as shown, for instance, in FIG. 3, or an amplitude by vibration during an operation such as a torque ripple peculiar to a machine. In this figure, the maximum value of the amplitude by vibration of torque under the ordinary operation is detected. As an example, the amplitude three times as high as the amplitude by vibration during an ordinary time is determined to be a "detecting level of vibration".

To detect a gain, a simulated disturbance torque is initially applied to the torque command under a low gain to recognize whether a response reaches the detecting level of vibration. When the response is low, the simulated disturbance torque is increased. The simulated disturbance torque is increased until the response exceeds the detecting level of vibration or the detecting level of vibration is lowered. Then, as shown in FIG. 4, while a control gain is gradually raised, the simulated disturbance torque is applied to a torque command τ ref shown in FIG. 2 to recognize the vibration. Specifically, the vibration is recognized from the amplitude of speed or torque. While the motor is stopped, the simulated disturbance torque is applied for a short time. Accordingly, a vibration damping element such as a static friction or a Coulomb's friction originally existing in the machine serves to stop an oscillation. When the vibration is detected, the control gain can be lowered so that the machine does not vibrate.

As a method for stopping the vibration, not only the control gain is lowered, but also the torque is temporarily decreased or both the methods may be commonly used. Otherwise, the base of a power transistor may be interrupted. Then, the control gain immediately before the oscillation is stored to calculate the control gain when the machine finally vibrates on the basis thereof. The control gain is set as a maximum gain.

Here, for explaining a basic concept of the present invention, a state that the control system oscillates is considered. Under a state that a load such as a friction of the machine does not exist, when a vibration arises in the control system due to the resonance of the machine, the vibration rapidly increases owing to the operation of a control loop gain to shift to an oscillating state. Thus, the vibration is hardly stopped. The load such as the friction serves to suppress the vibration by consuming energy. Under an unstable state that there is a mechanical load, however, the control gain is high so that the vibration is liable to arise, the load is varied so that the vibration can be caused or the caused vibration can be conversely stopped.

In the present invention, to make the unstable state, a step type simulated disturbance torque as shown in a control block diagram of FIG. 2 is applied to overcome the mechanical load such as the friction, break a stable state and cause the vibration. A time for applying the simulated disturbance torque is set to a short time, so that the vibration can be stopped immediately after the vibration is detected in the vibration detecting circuit.

Figure 5:
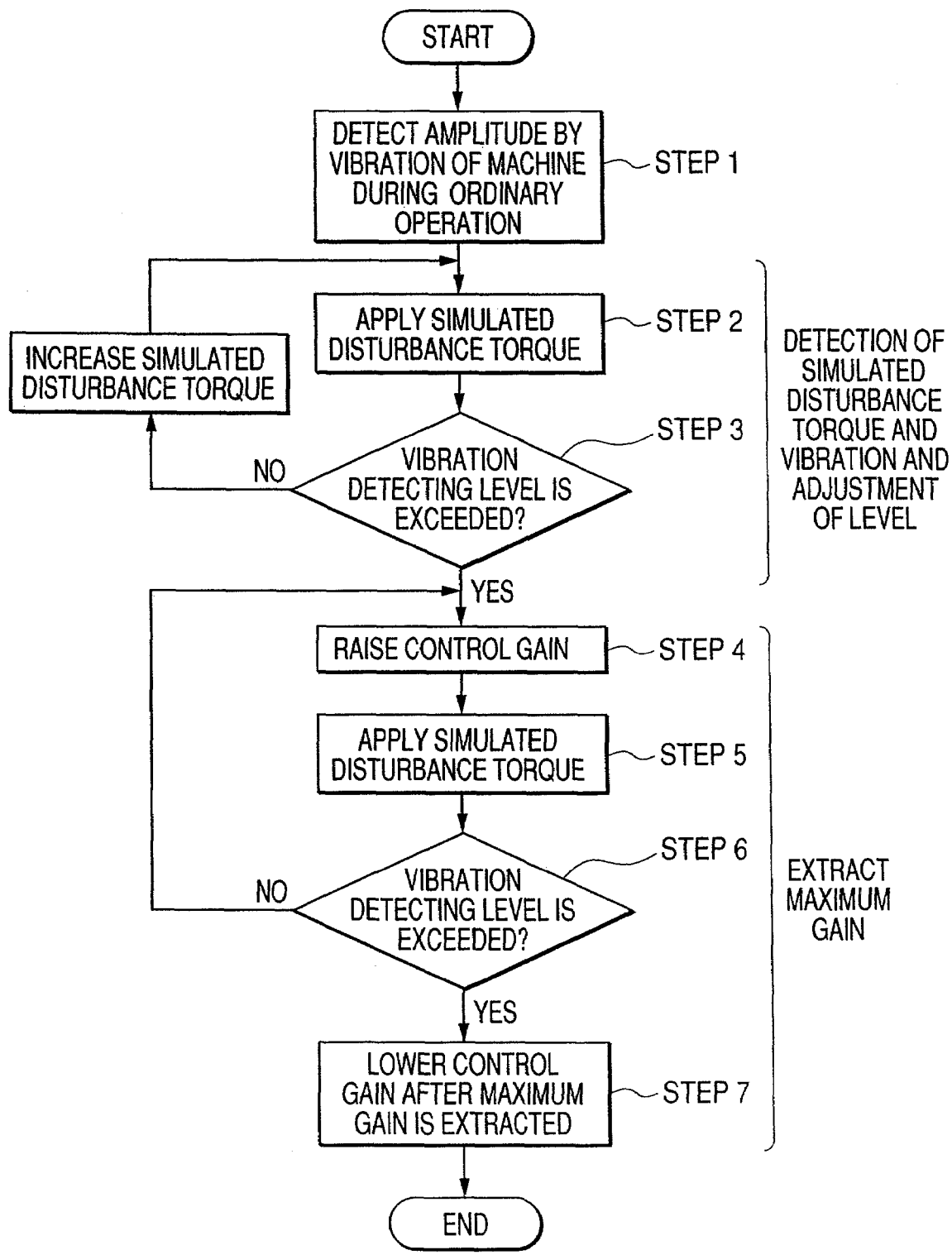
FIG. 5 is a schematic flowchart for extracting the maximum gain of the present invention.
Figure 6A:
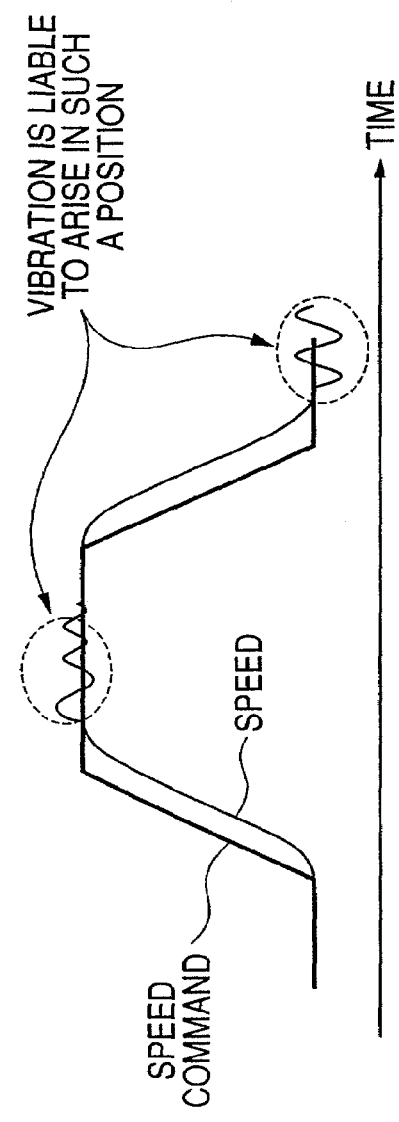
FIG. 6($a$) is a timing chart when a machine vibrates under an ordinary operation.
Figure 6B:
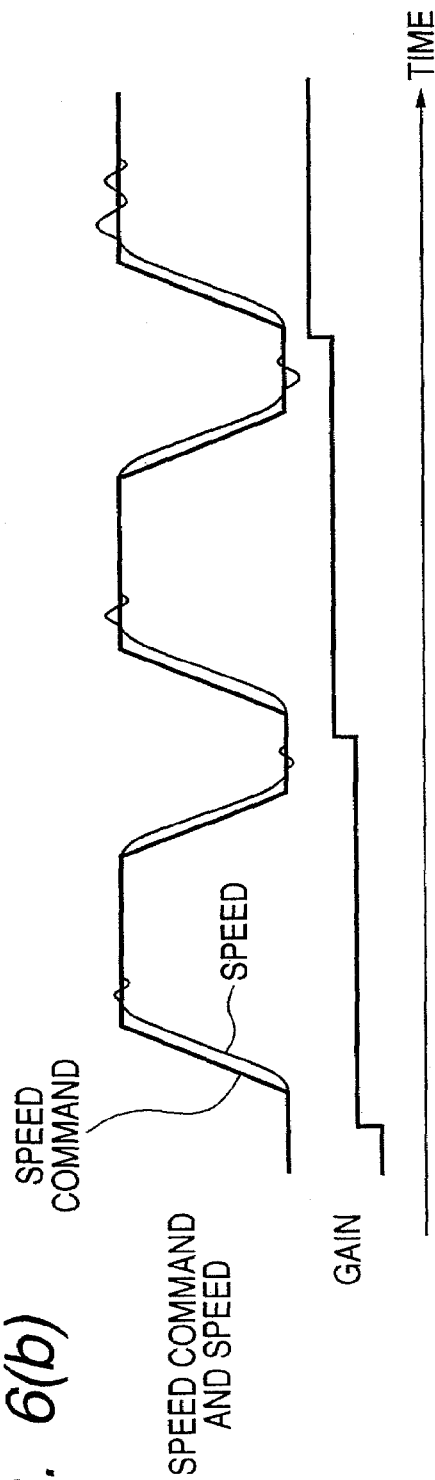
Figure 7:
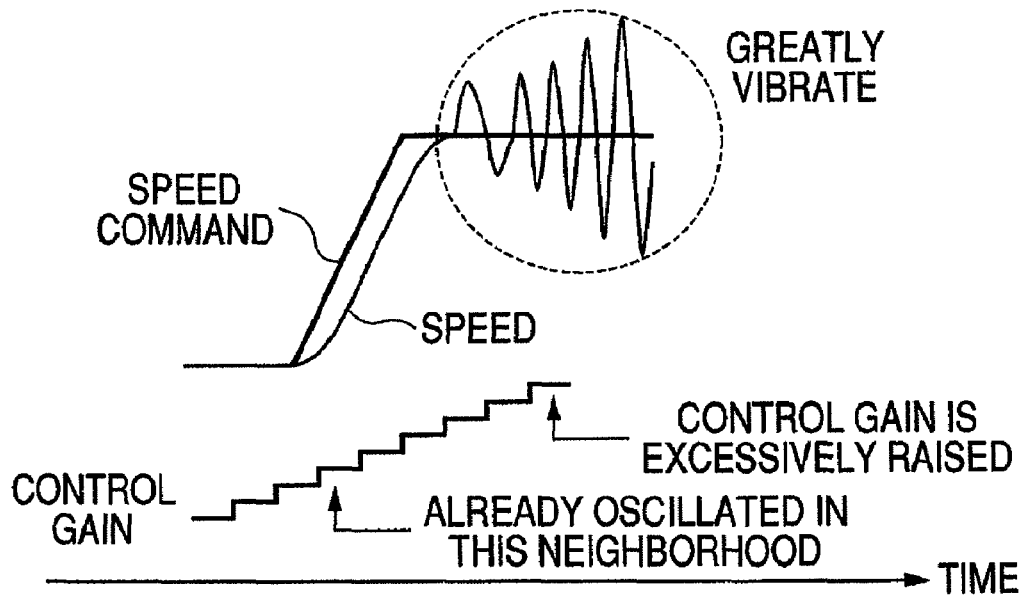
FIG. 7 is a diagram showing an example that when the gain is adjusted under the ordinary operation, the gain is quickly raised so that the machine greatly oscillates.
Figure 8:
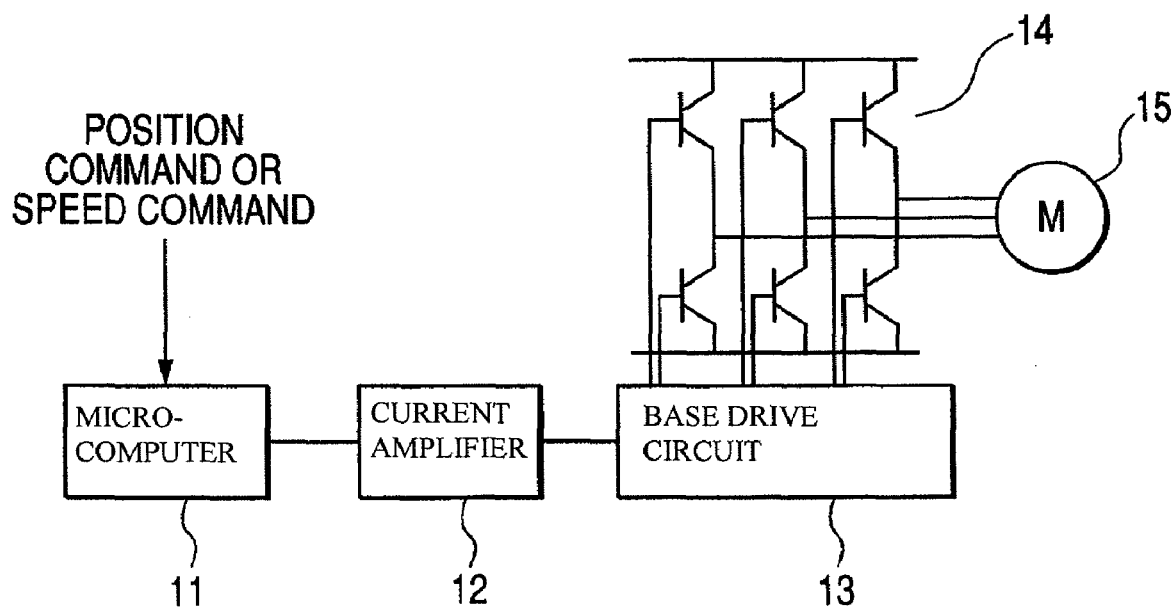
FIG. 8 is a block diagram of a usual example.

Now, referring to FIG. 5, a method for detecting the maximum gain will be described below.

(1) Detection of vibration level during ordinary operation: A specific detecting procedure of the maximum gain is described below. Initially, the gain of a control system such as a position loop gain or a speed loop gain is lowered in step 1 to detect the amplitude by vibration during the operation peculiar to the machine under the ordinary operation or the like as shown in FIG. 3. In this figure, the maximum value of the amplitude by vibration of the torque during the ordinary operation is detected.

(2) Adjustment of simulated disturbance torque: Then, as shown in step 2 of FIG. 5, the gain of the control system such as the position loop gain or the speed loop gain is set to a low value and the step type simulated disturbance torque is applied to the torque command τ ref shown in the control block diagram of FIG. 2 to recognize that a positional deviation or a response of such as speed is not lower than a prescribed level as in step 3 of FIG. 5. Here, when the response not lower than the prescribed level is not obtained, the applied simulated disturbance torque is considered not to exceed the mechanical load so that the simulated disturbance torque is increased so as to increase the response to a predetermined level. The level of the response is set to, for instance, two times as high as the maximum value of the amplitude by vibration under the ordinary operation that is detected in the step 1 of FIG. 5.

Then, when the response is not increased even by raising the simulated disturbance torque to the predetermined level, the vibration detecting level of the response is lowered. In such a way, the simulated disturbance torque and the detecting level of the response are adjusted.

(3) Detection of vibration: After the level of the simulated disturbance torque is determined, the control gain is stepwise raised at such a timing as shown in FIG. 3. When the control gain is raised as in steps 4 to 6 shown in FIG. 5, the simulated disturbance torque is applied to the torque command to recognize the vibration in the vibration detecting circuit 1. The vibration detecting circuit 1 compares an amplitude of a torque or a speed e.g. with the vibration detecting level, and when the amplitude is large, the vibration detecting circuit 1 detects the amplitude as the vibration. The vibration detecting level is set to, for instance, 1.5 times as high as the previously adjusted response level.

(4) Stop of vibration: After the simulated disturbance torque is applied, when the vibration exceeding the vibration detecting level as in step 6 of FIG. 5, the exertion of the simulated disturbance torque at such a timing as shown in FIG. 4 is stopped and the control gain is lowered to a level at which the vibration does not arise as in step 7 of FIG. 5 (for instance, a control gain half as high as the control gain when the vibration is detected or the initially set low control gain). Otherwise, to assuredly stop the vibration, the torque command is restricted or the positional deviation is momentarily set to zero.

(5) Detection of maximum gain: Then, the control gain immediately before the control gain obtained when the vibration arises is stored in a storing unit of the microcomputer 2 as the maximum gain.

Here, a relation between the simulated disturbance torque and the control gain when the vibration is generated will be described below. When the simulated disturbance torque is increased, an impact to the machine is also increased and the control gain having no vibration generated is decreased. The machine is accelerated or decelerated or a filter is inserted to smooth the torque so that the impact is reduced. Therefore, the control gain is raised. When the step type disturbance torque is applied as shown in the block diagram of FIG. 2, speed responds thereto for τ/JmS minutes. Thus, the load can be overcome by the torque to break a balanced state. Further, the torque to be applied needs to be increased in accordance with inertia. When a position is moved, the torque is smoothed, so that the vibration is hardly generated. However, the torque is directly transmitted to the load, the vibration is liable to arise. The vibration may be detected by the microcomputer 2 in place of the vibration detecting circuit 1. Further, an integrating gain or a torque filter may be operated in association with the control gain.

INDUSTRIAL APPLICABILITY

The machine is vibrated by a low gain so that the maximum gain can be assuredly obtained. Further, since the control gain is decreased immediately after the vibration is generated, an oscillation can be suppressed.

The invention claimed is:

1. A method for extracting a maximum gain of a servo controller for driving a servo motor comprising the steps of:
    applying a simulated disturbance torque to a torque command by a vibrating unit while a control gain is raised, and detecting the vibration of a control system by a vibration detecting unit;
    repeating a process for applying the simulated disturbance torque while the control gain is raised until the vibration of a prescribed level is detected, and
    setting the control gain when the vibration detecting unit detects the vibration exceeding the prescribed level as a maximum gain.

* * * * *